United States Patent
Loucks et al.

(10) Patent No.: US 11,457,085 B2
(45) Date of Patent: Sep. 27, 2022

(54) COMPUTER-BASED SYSTEMS AND/OR COMPUTING DEVICES CONFIGURED FOR PUSH-BASED TRANSMISSIONS USING THE TARGET AS A SYSTEM OF RECORD

(71) Applicant: Capital One Services, LLC, McLean, VA (US)

(72) Inventors: Eric Loucks, Highlands Ranch, CO (US); Ethan Lo, McLean, VA (US); Daniel John Marsch, Sterling, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 63 days.

(21) Appl. No.: 17/142,617

(22) Filed: Jan. 6, 2021

(65) Prior Publication Data
US 2022/0217216 A1  Jul. 7, 2022

(51) Int. Cl.
*H04L 67/55* (2022.01)
*H04L 43/0817* (2022.01)
*H04L 41/0816* (2022.01)
*H04L 67/52* (2022.01)

(52) U.S. Cl.
CPC .......... *H04L 67/55* (2022.05); *H04L 41/0816* (2013.01); *H04L 43/0817* (2013.01); *H04L 67/52* (2022.05)

(58) Field of Classification Search
CPC . H04L 67/26; H04L 41/0816; H04L 43/0817; H04L 67/18
See application file for complete search history.

(56) References Cited

U.S. PATENT DOCUMENTS

| | | | |
|---|---|---|---|
| 8,930,498 B2 * | 1/2015 | Votaw | G06Q 40/02 709/219 |
| 9,172,822 B2 | 10/2015 | Abou-Assali et al. | |
| 9,264,461 B1 | 2/2016 | Van de Wetering | |
| 9,323,868 B2 | 4/2016 | Balakrishnan et al. | |
| 9,386,020 B2 * | 7/2016 | Gold | H04L 63/10 |
| 9,407,705 B2 * | 8/2016 | Metral | H04W 4/12 |
| 9,729,555 B2 | 8/2017 | Ferguson et al. | |
| 2008/0057964 A1 * | 3/2008 | Gilhuly | H04L 67/1095 455/445 |

(Continued)

*Primary Examiner* — Benjamin M Thieu
(74) *Attorney, Agent, or Firm* — Greenberg Traurig, LLP

(57) ABSTRACT

An example method includes receiving user profile configuration information identifying a user and determining a recipient list for push-based information updates. The recipient list comprises a plurality of other computing devices and the recipient list is associated with the user profile configuration information. The method further includes determining an information set or application for the push-based information updates. The method further includes receiving an input comprising a change to the information set or the application. The method further includes running a daemon process as a background process of an operating system of the computing device. The daemon process is configured to monitor the information set or the application for the change and automatically transmit the change directly to the plurality of other computing devices without being received by any intermediate devices so as to push the change upon the receiving of the change to the information set or the application.

20 Claims, 10 Drawing Sheets

(56) References Cited

U.S. PATENT DOCUMENTS

| | | | |
|---|---|---|---|
| 2010/0144318 A1* | 6/2010 | Cable | H04L 67/1095 |
| | | | 455/412.1 |
| 2011/0113084 A1* | 5/2011 | Ramnani | H04W 4/16 |
| | | | 709/201 |
| 2013/0047034 A1* | 2/2013 | Salomon | G06Q 20/3224 |
| | | | 714/18 |
| 2013/0217365 A1* | 8/2013 | Ramnani | H04L 67/306 |
| | | | 455/414.1 |
| 2013/0303134 A1 | 11/2013 | Ramnani | |
| 2014/0364104 A1* | 12/2014 | Wood | H04W 4/50 |
| | | | 455/418 |

* cited by examiner

COMPUTER-BASED SYSTEMS AND/OR COMPUTING DEVICES CONFIGURED FOR PUSH-BASED TRANSMISSIONS USING THE TARGET AS A SYSTEM OF RECORD

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based platforms/systems, improved computing devices/components and/or improved computing objects configured for one or more novel technological applications of push-based transmissions using the target as a system of record.

BACKGROUND OF TECHNOLOGY

A computer network platform/system may include a group of computers (e.g., client devices (e.g., laptops, desktop computers, tablets, smartphone devices, internet of things (IOT) devices, etc.), servers, wireless routers or other networking devices) and other computing hardware devices that are linked together through one or more communication channels to facilitate communication and/or resource-sharing, via one or more specifically programmed computing devices, among a wide range of users.

SUMMARY OF DESCRIBED SUBJECT MATTER

In some embodiments, the present disclosure provides an exemplary technically improved computer-based method that includes at least the following steps of receiving, by a processor of a computing device, user profile configuration information identifying a user. The method further includes determining, by the processor, a recipient list for push-based information updates. The recipient list comprises a plurality of other computing devices and the recipient list is associated with the user profile configuration information. The method further includes determining, by the processor, an information set or application for the push-based information updates. The method further includes receiving, by the processor, an input comprising a change to the information set or the application. The method further includes running, by the processor, a daemon process as a background process of an operating system of the computing device. The daemon process is configured to monitor the information set or the application for the change and automatically transmit the change directly to the plurality of other computing devices without being received by any intermediate devices so as to push the change upon the receiving of the change to the information set or the application.

In some embodiments, the present disclosure provides an exemplary technically improved computer-based system that includes at least the following components a memory, a display, and at least one processor of a computing device that is coupled to the memory. The at least one processor is configured to receive user profile configuration information identifying a user. The at least one processor is further configured to determine a recipient list for push-based information updates. The recipient list comprises a plurality of other computing devices and the recipient list is associated with the user profile configuration information. The at least one processor is further configured to determine an information set or application for the push-based information updates. The at least one processor is further configured to receive an input comprising a change to the information set or the application. The at least one processor is further configured to run a daemon process as a background process of an operating system of the computing device. The daemon process is configured to monitor the information set or the application for changes and automatically push the change to the information set or the application upon the receiving of the change to the information set or the application.

In some embodiments, the present disclosure provides an exemplary technically improved non-transitory computer readable medium having instructions stored thereon that, upon execution by a computing device, cause the computing device to perform operations including receiving user profile configuration information identifying a user. The operations further include determining a recipient computing device for push-based information updates based on the user profile configuration information. The recipient computing device is associated with a financial institution with which the user has an account. The operations further include determining transaction details of a transaction that has occurred related to the account. The operations further include running a daemon process as a background process of an operating system of the computing device. The daemon process is configured to monitor the computing device for transactions that occur and automatically transmit the transaction details directly to the recipient computing device without being received by any intermediate devices so as to push the transaction details upon the determining that the transaction has occurred. The transaction details comprise information configured for verification of the transaction by the financial institution.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
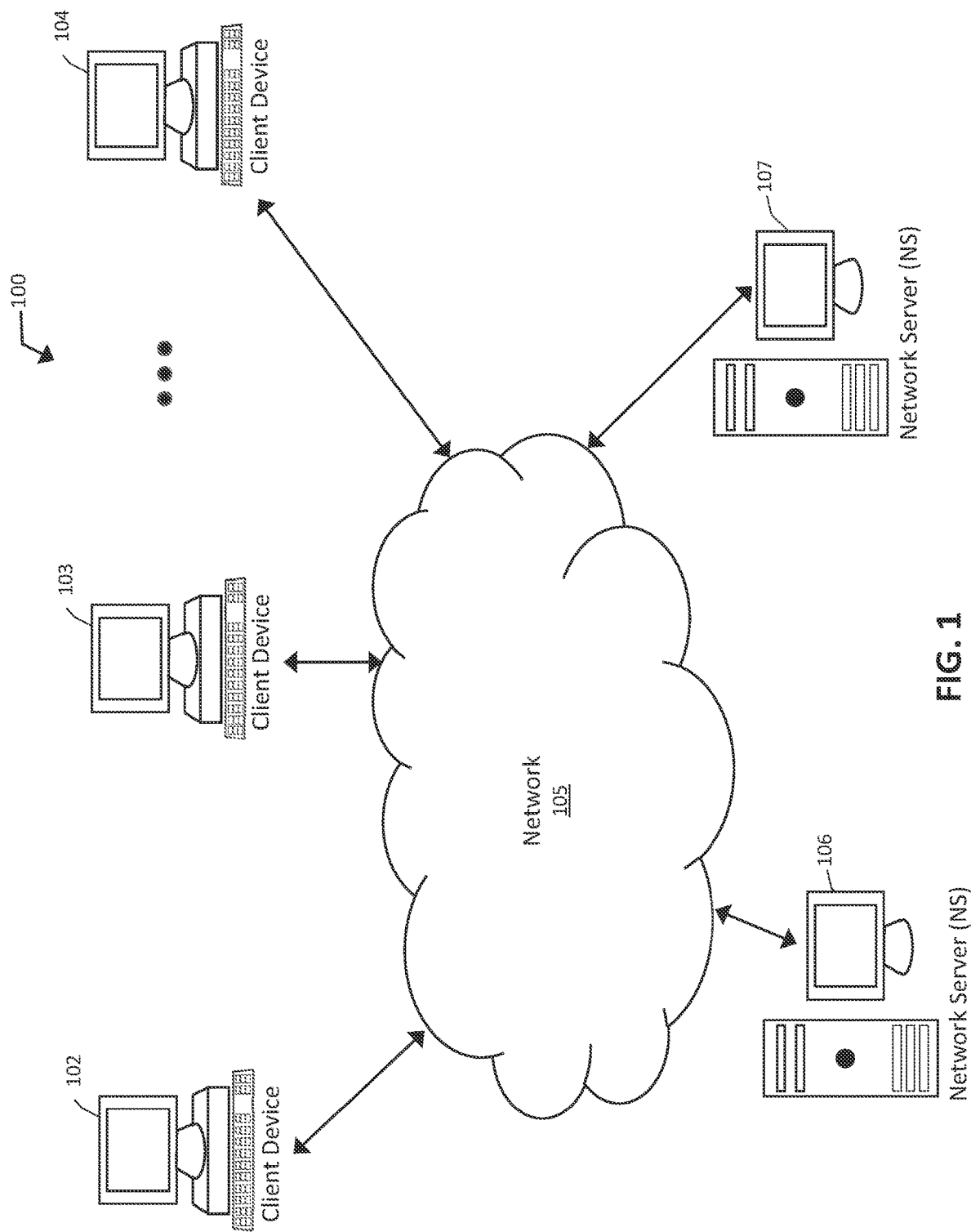
FIG. 1 is a block diagram depicting a computer-based system and platform in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

Described herein are methods, systems, computer readable media, etc. for push-based transmissions using the target as a system of record. Various embodiments described herein include technical aspects that reduce the number of devices used to distribute changes to information or new information generated by a user of a client electronic device. The various embodiments described herein further include technical aspects that reduce the number of clicks and/or actions taken by users of client devices to distribute changes in information changes to information or new information generated by a user of a client electronic device.

First, with respect to reducing the number of devices used to distribute changes, a user of a client device may generate new information or may make changes to existing information (the generation of new information or changes to existing information may be collectively referred to herein as a change to an information set). That change to the information set may be monitored and detected automatically by a process running on the client's device (e.g., a background or daemon process running as part of an operating system). When the change is detected, the change to that information may be automatically pushed to other client devices by the client device on which the change was initially detected. The client devices to which the change is pushed may include devices specified by the user, devices to which the user has communicated with in the past, and/or a predefined list of devices.

In some embodiments, the process operating on the client device may detect the change and transmit it to other devices without the change being sent to and/or processed by another device (e.g., an application server). For example, applications on a client device may communicate with an application server typically, but in various example embodiments described herein, the changes may not pass through, be communicated to, or otherwise be transmitted to an application server. In this way, the change to the information may be communicated directly to the other client devices without being transmitted to intermediate device(s). However, the client device may, in various embodiments, utilize intermediate communications infrastructure (e.g., network infrastructure such as data lines, wireless access points (WAPs), base stations, data/voice/text switching network infrastructure, other internet communications infrastructure, satellite communications infrastructure, etc.).

Some embodiments of non-intermediate device transmission between client devices may be configured for distributing updated or new information to a group of client devices (e.g., contacts of a user) without the involvement of a backend server or servers, such as an application server. The non-intermediate device transmission may provide a user with more control over and/or security for their data, as the data is received by and/or processed by fewer devices than in systems where a backend server(s) facilitates or otherwise processes information updates. By having fewer devices process the information updates, there are fewer opportunities for the data to be accessed by unauthorized parties or otherwise be breached, for example. In addition, the technical solutions described herein may also provide for more efficient distribution of information updates. When the information passes through or is processed by fewer devices, less computing resources may be needed, and the information may be transmitted and may be received in less time than a system that uses more intermediate devices to process, store, and/or route information.

In addition, the systems and methods described herein may offer other technical benefits. For example, various embodiments described herein may allow a user to avoid updating other devices individually, such as by sending updated documents, contact information, etc. to other devices and/or other users manually. With the various embodiments described herein, such information updates may be monitored for and sent to other devices automatically.

Furthermore, the embodiments described herein may use a background process to monitor for and send information updates. For example, a daemon process of a device's operating system may monitor for information updates and automatically send the updates to other devices once the process determines that an information update has occurred. In this way, the device may always be running a process to check for information updates whenever the device is running without having to run or launch a separate application for monitoring and sending information updates. By operating as part of a process of the device's operating system, the process may use less processing power of the device. Similarly, a device that receives the information updates may also be running a daemon process in the background as part of the device's operating system. Thus, the receiving device may also receive the information updates and update the information set or application to which the updates apply accordingly without running or launching a separate application to do so.

Advantageously, the embodiments described herein further ensure that information sets and/or applications are updated. In some embodiments, an information set may include information that may be updated by multiple different devices (e.g., a contact list may have contact information that may be updated by multiple parties related to different contact information stored in the contact list). Using the methods and systems described herein, updates may be pushed from various devices to keep the contact list up to date, rather than a single device having to request or pull updates from a plurality of devices.

The embodiments described herein may also reduce the number of clicks, touches, or other interactions taken by a user of a device to receive and/or send information updates. Such features provide improved ease of use for a user and may require less processing to send or receive information updates. For example, automatically determining that an information set has changed, pushing the change, and updating the information set on the device that received the change may all occur automatically without interaction from a user. Accordingly, the devices involved may not have to perform any processing related to a user action, such as displaying prompts to a user on a display, receiving responses to those prompts, etc. Thus, processing loads on devices may be reduced, all while improving convenience and ease of use for a user.

The push-based updates described herein therefore solve technological problems with updating information sets or applications stored on multiple electronic devices, using the technological solutions necessarily rooted in computer technology described herein to improve security and/or performance for those devices and the information exchanged between those devices. As a further example, battery life and usage are common concerns for mobile electronic devices. Using the embodiments described herein, persons using a mobile electronic device that monitors for and automatically pushes and receives information will use less processing power, thereby preserving battery life. Running a background process to monitor for updates may tax the mobile electronic device's processing capabilities and battery life less because a separate application is not always running and the device does not need to facilitate further user interaction as described herein.

For example, based on at least the problems and solutions described herein, at least some embodiments of the present disclosure therefore result in improved functioning of mobile electronic devices, network resources, and/or back end servers (including cloud computing resources). For example, according to the various techniques described herein, a database, lookup table, or similar data structure of relationships between a user, their financial account(s), and their electronic device(s) (including, e.g., information about how to communicate with those devices such as phone numbers, user names, internet protocol (IP) addresses, media access control (MAC) address, or other type of identifying information used to communicate with a device), as well as other users and their electronic device(s) may be used to facilitate efficient push-based updates of changes to information. These stored relationships may facilitate efficient routing and/or execution of sending out those push-based updates. For example, a lookup table or database may include the parties or devices to whom a particular information updates should be sent, how to best route that information update, what communication protocol or network to use to send that information update, etc.

A lookup table, database, etc. may also include relationships between users. For example, relationships between users may include users who have one another in their contact lists, have been shared an information update before of a particular type or related to a particular application, have been opted into an information sharing relationship by a user, or any other preexisting relationship between users. This lookup table, database, etc. may be stored on each user's device so that when a daemon process running in an operating system detects a change, the database or lookup table may be referred to in order to determine what devices/users to distribute the information update to. Because these relationships may be pre-established in a database, lookup table, etc. stored in a memory of an electronic device, those relationships can be looked up at later times without taxing computing resources to rebuild or re-determine the relationships each time. This represents a demonstrable technological improvement that allows a user device to quickly and easily send push-based information updates. In other words, the embodiments herein provide for a particular manner of summarizing information by and on electronic devices, such that the electronic devices provide specific manners for pushing updates to a limited set of users or devices relevant to a user, rather than using conventional methods to send information.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIG. 1 is a block diagram depicting a computer-based system and platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 1, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer or machine readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 1, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 2:
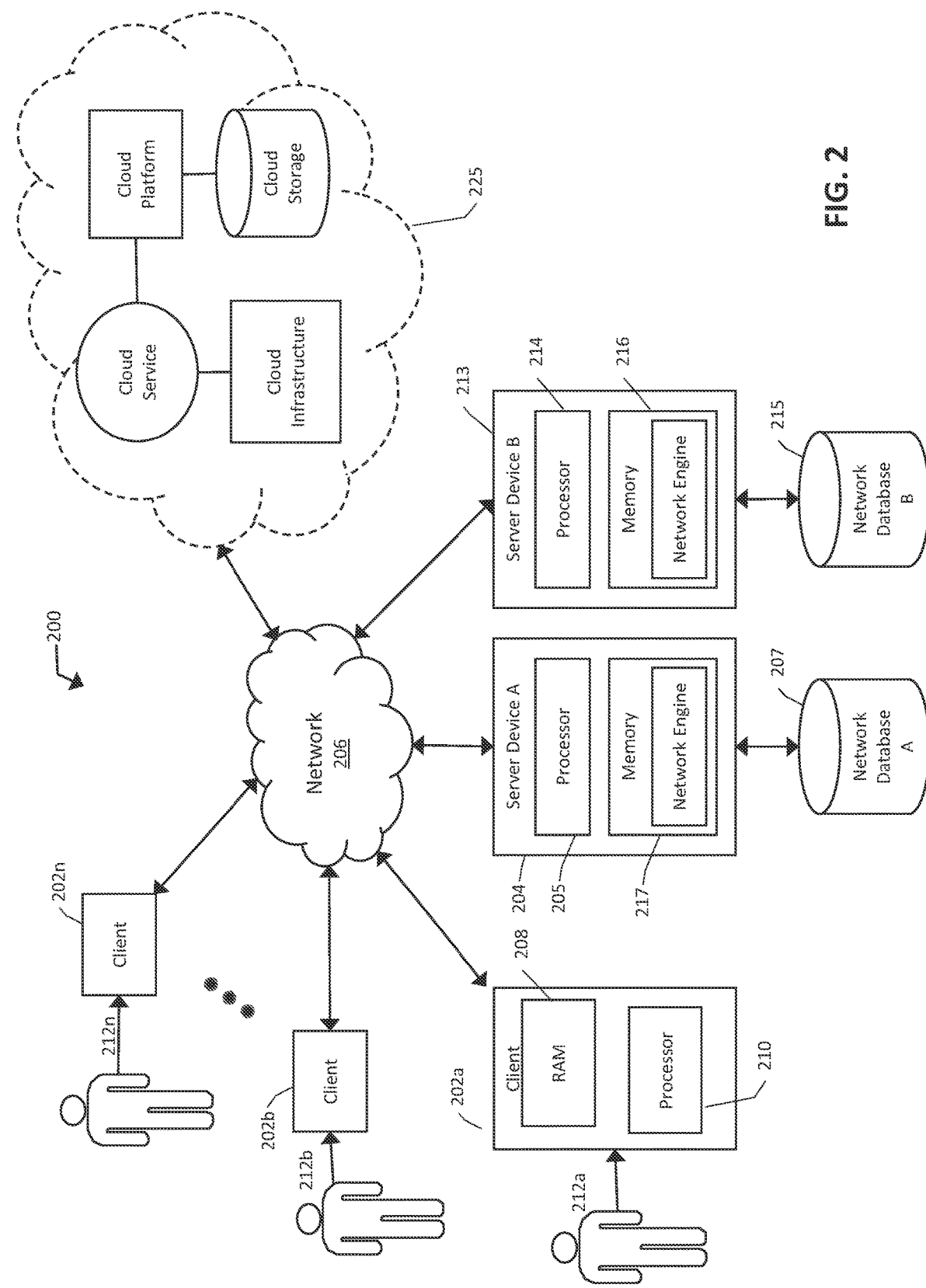
FIG. 2 is a block diagram depicting another computer-based system and platform in accordance with one or more embodiments of the present disclosure.

FIG. 2 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b through 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202a through 202n may also comprise a number of external or internal devices such as a mouse, a CD-ROM, DVD, a physical or virtual keyboard, a display, or other input or output devices. In some embodiments, examples of member computing devices 202a through 202n (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202a through 202n may be specifically programmed with one or more application programs in accordance with one or more principles/methodologies detailed herein. In some embodiments, member computing devices 202a through 202n may operate on any operating system capable of supporting a browser or browser-enabled application, such as Microsoft™ Windows™, and/or Linux. In some embodiments, member computing devices 202a through 202n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202a through 202n, users, 212a through 212n, may communicate over the exemplary network 206 with each other and/or with other systems and/or devices coupled to the network 206. As shown in FIG. 2, exemplary server devices 204 and 213 may be also coupled to the network 206. In some embodiments, one or more member computing devices 202a through 202n may be mobile clients.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 3:
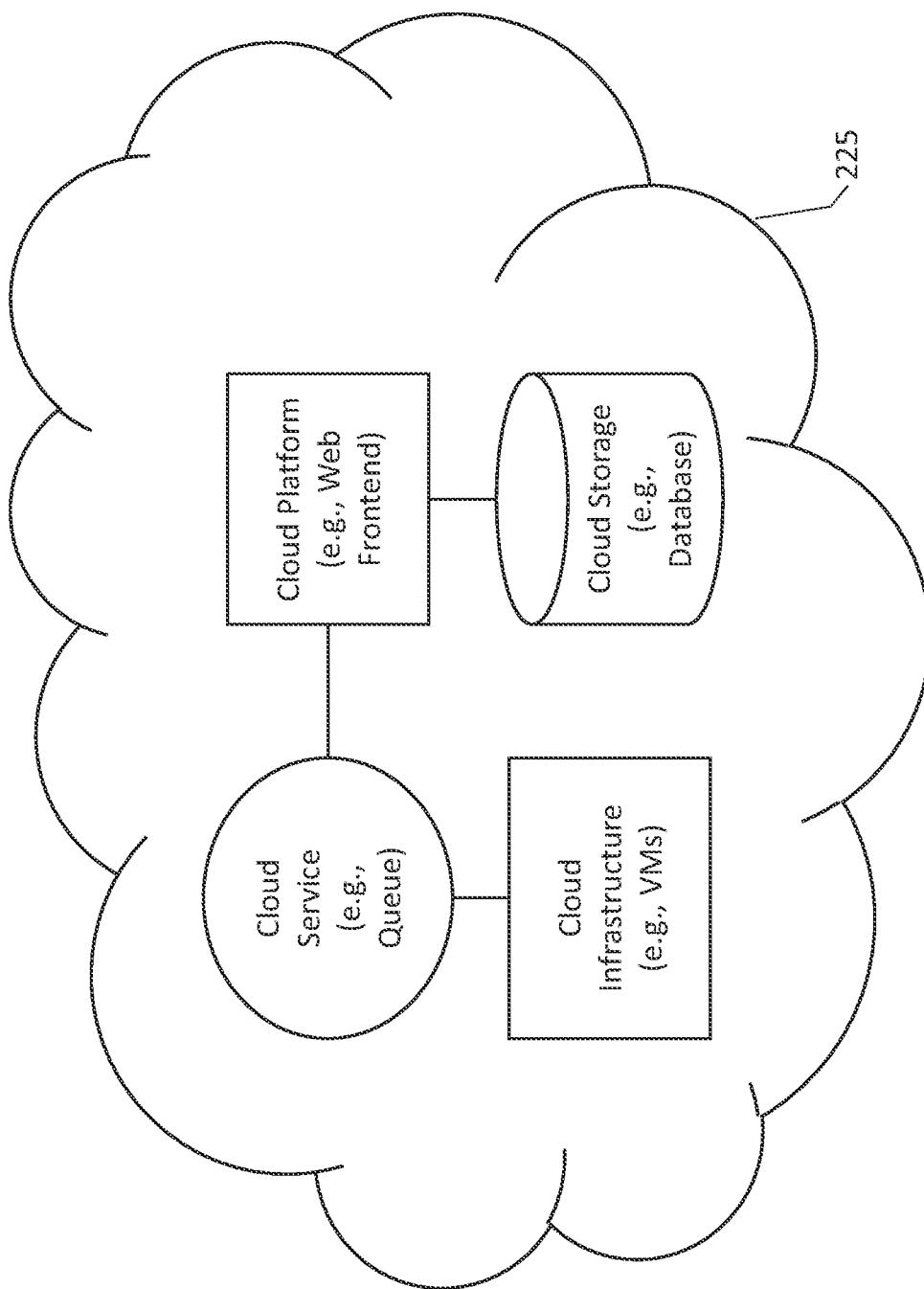
FIGS. 3 and 4 are diagrams illustrating implementations of cloud computing architecture/aspects with respect to which the disclosed technology may be specifically configured to operate, in accordance with one or more embodiments of the present disclosure.

As also shown in FIGS. 2 and 3, some embodiments of the disclosed technology may also include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

Figure 4:
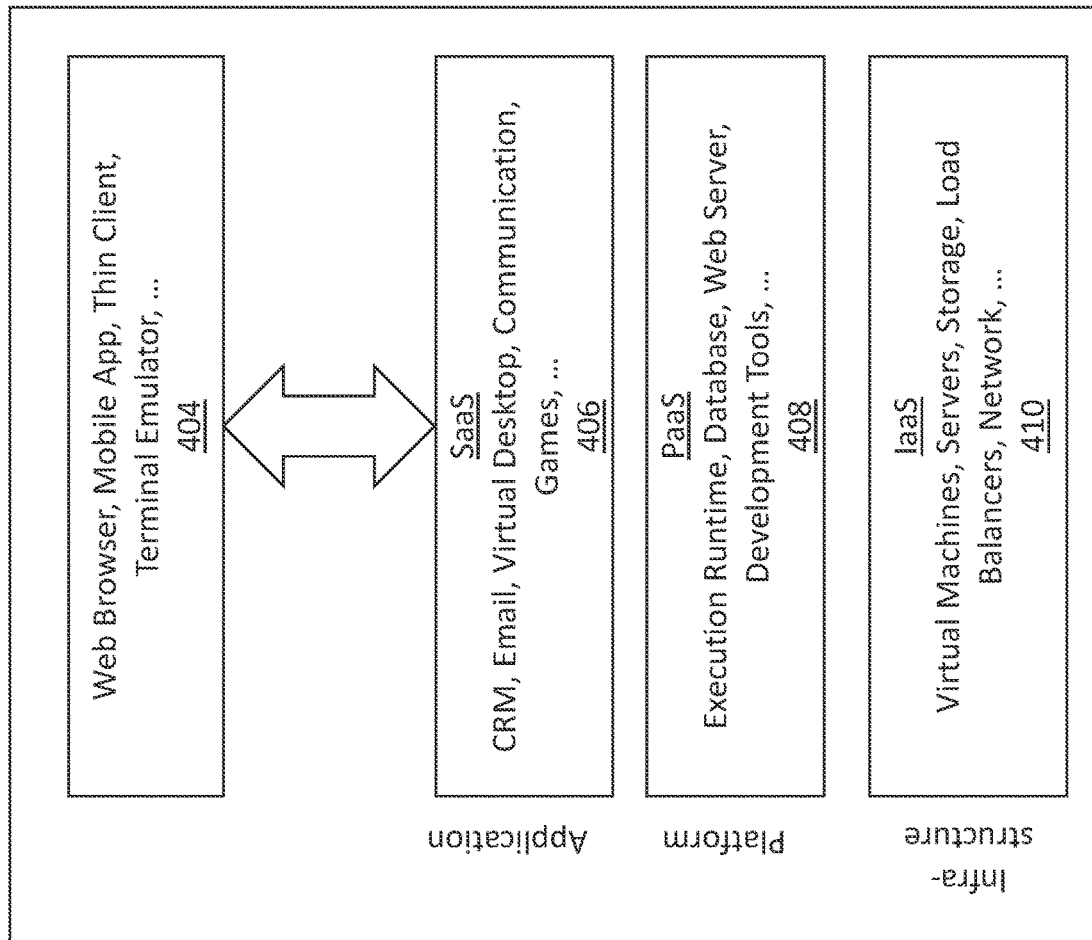

According to some embodiments shown by way of one example in FIG. 4, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. FIGS. 3 and 4 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate.

In various embodiments, different aspects described with respect to FIGS. 1-4 may be used. For example, client devices 102, 103, and 104 of FIG. 1 may share information updates with one another via the network 105 without the information updates being processed or routed through the network servers 106, 107. Similarly, client devices 202a through 202n FIG. 2 may share information updates with one another via the network 206 without routing the information update through the server devices 204 and 213, and/or without routing the information update through the cloud components 225. In other words, the client devices shown in FIGS. 1 and 2 may transmit push-based information updates to one another without routing such information updates through a server. In the examples of FIGS. 1 and 2, the information updates may be routed through network infrastructure and devices. However, in other various embodiments described herein, information updates may be routed through no intermediate network infrastructure. In various embodiments, the network infrastructure may also include various types of networks or various network components. For example, FIGS. 7-10 show further examples of network infrastructure that may be used to route information updates. In various embodiments, various combinations of the components shown in FIGS. 1-4 and 7-10 may be used to implement the systems and methods described herein.

In various embodiments, information updates may be routed to a server or cloud components, such that endpoint devices for an information update may include a server or cloud component. In other words, an information update may be pushed to server or cloud devices as well as other user/client devices. However, in such embodiments, the information is not routed through a server or cloud component to other client devices. Rather, the server or cloud components are merely another device to which information updates may be pushed. This may be useful where, for example, a user backs up the data from their client device on a remote server. In this way, even though the information updates may be routed to server or cloud component, all the advantages as described herein may still be accomplished.

Figure 5:
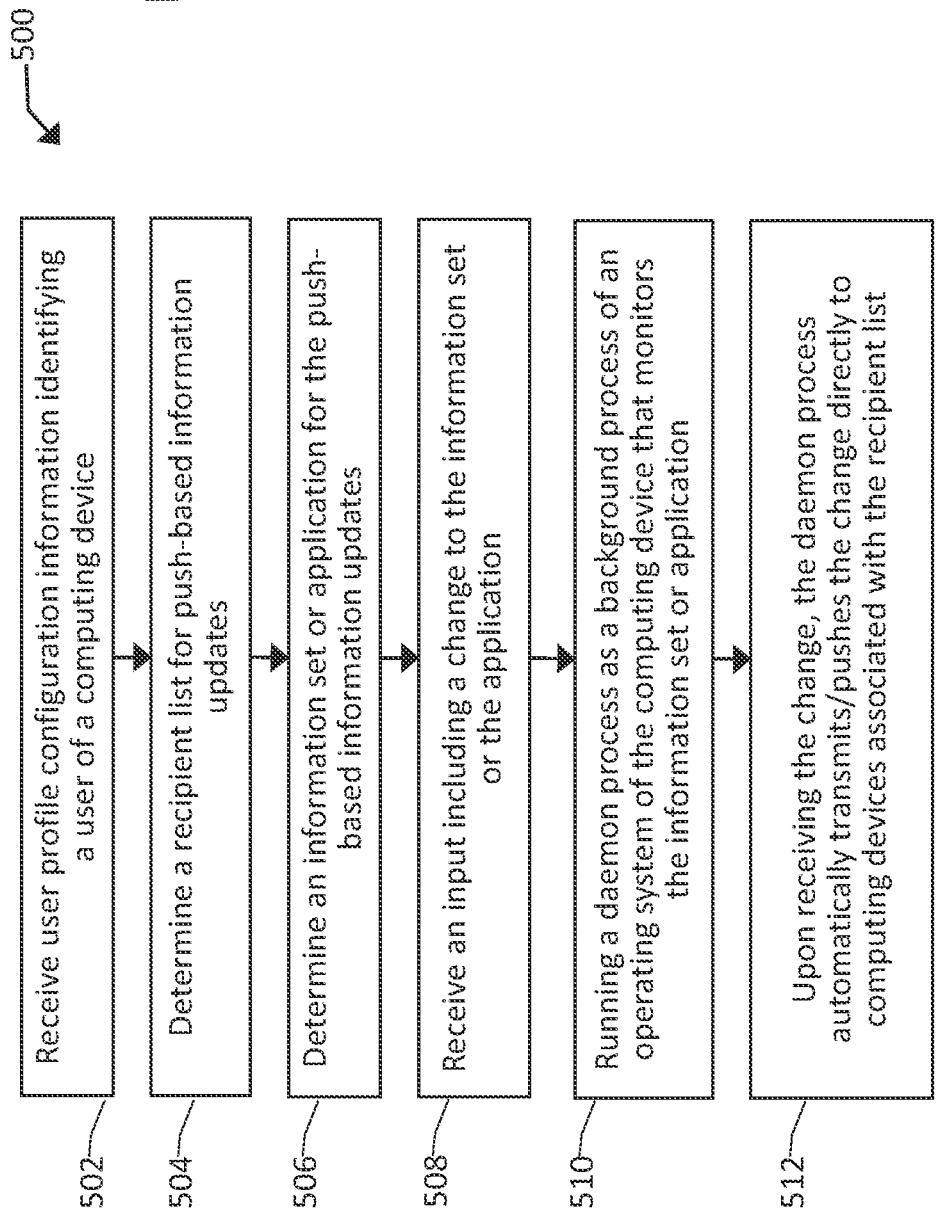
FIG. 5 is a flowchart illustrating a process for push-based transmissions using the target as a system of record in accordance with one or more embodiments of the present disclosure.

FIG. 5 is a flowchart illustrating a process 500 for push-based transmissions using the target as a system of record in accordance with one or more embodiments of the present disclosure. The process 500 includes operations that may be performed, for example, by a client device of FIGS. 1, 2, and/or 7-10.

At an operation 502, user profile configuration information that identifies a user is received by a computing device, such as a client device of FIGS. 1, 2, and/or 7-10. User profile configuration information may include any information that identifies a user, such as demographic data, name, address, government issued identification or social security number, age, birth date, place of birth, login name, password, biometric information (e.g., fingerprint, face), etc. A user may enter such information to identify themselves, so that their use of the device may be correlated to the user identified by the user profile configuration information. Accordingly, with the user profile configuration information, a device may be associated with a particular user, and subsequently with other users and/or devices to which information updates are sent.

At an operation 504, a recipient list for push-based information updates is determined. In other words, the system may determine a recipient list that includes identifying devices to which information updates should be sent. Such information may be determined in various ways. For example, the recipients for an information update may be devices associated with other users that a user of the client device has previously indicated information updates should be sent to. In other words, a user may select which other devices/users information updates may be sent to. Recipients may also be users/devices to which an update has previously been sent manually. In addition, a user may indicate which types of information changes should be sent out to other devices. In such examples, the recipient list determined may therefore be different for different types of information changes detected. For example, information of a certain type and/or information associated with a particular application may be associated with different recipients. Any combination of methods for determining a recipient list may also be used. For example, a recipient list may be determined based on a type of information, who previous recipients of that type of information update are, and/or any recipients/users that have been manually specified for distribution. In some embodiments, a recipient device may transmit a request to subscribe to certain types of information updates and/or for a specific type of information. If a user approves sharing information and/or information updates with the requester, that requester device may be considered to be part of a recipient list for that type of data should a change or update be detected for that data in the future.

A recipient list may also be associated the user profile configuration information. In other words, the devices determined to be on a recipient list may be linked or otherwise determined based on information in the user profile configuration information. For example, updates may be shared with other devices upon which a user has logged into with the same user profile configuration information because, for example, those devices are presumably owned by or controlled by the same person, user, family, etc. The user profile configuration information may further be used to determine recipients for the information updates that are not the user themselves. For example, the user profile configuration information may be used to determine known contacts to which information updates should be sent, such as recipient devices previously determined to be recipient devices on a different device which has already received the sender's user profile configuration information.

In various embodiments, a user may also be able to deselect or opt out of sending certain devices/users information updates. For example, an information update of a certain type may have been sent to a particular device/user before, but a user interface of the sender device may be used to deselect that particular device/user so that it is no longer a recipient device. That deselection may be made to deselect a client device for all information updates, or may be deselected for only certain information types.

A sender device may also receive a message from a recipient device that includes a request to opt out of future information updates. Such a request may be related to all information updates from the sender device, or just one or more specific types of information updates. The sender device may use such requests to further determine a recipient list. That is, when a recipient requests to not be sent information updates, the sender device does not include that recipient when determining a recipient list for an information update.

At an operation 506, an information set or application for the push-based information updates is determined. This operation may be performed in concert with the operation 504 if an information update is to be transmitted to recipients based on the type of information or application the information update is related to. However, in any case, the operation includes determining which information sets or applications should actually be monitored for push-based information updates. Such information sets or applications may be default set on a device, may be manually defined by a user, may be set over time as the user agrees to have certain information sets or applications share data or otherwise be monitored for changes, etc. For example, a user may receive a request to send contact information with a different user device. After such a transmission occurs, the device may determine that the information set on the device including the sending user's contact information should be monitored for changes if it was not already, so that in the future if the sender's device updates its contact information such updates can be pushed to other devices. In various embodiments the user's device may also prompt the user for permission to monitor a particular information set or application for updates before monitoring that information set or application.

At an operation 508, an input including a change to the information set or the application is received at the client device. For example, the user may manually change the information, may use an application to change information associated with an application, etc. In some cases, the information may not be manually updated by the user. For example, the information may be automatically updated by the device after receiving the information from a different device. In various embodiments, the updates may be received or input to the device in any manner.

At an operation 510, a daemon process runs as a background process of an operating system of the computing device to monitor the information set or application for changes. The daemon process may run in the background as part of the operating system of the device so that a particular application need not run to determine when changes to an information set occur. Accordingly, the daemon process monitoring for changes may be operating whenever the client device is operating.

At an operation 512, upon receiving the change to the information set or the application at the operation 508, the daemon process automatically transmits the change to the information set or the application directly to the plurality of other computing devices determined to part of the recipient list for the push-based information updates at the operation 504. By sending the information updates directly to the other devices, the information updates may be received by the recipient devices without being received by any intermediate devices. In other words, the determining of the recipients at the originator or sender device removes any need for intermediate receipt, processing, and transmitting of the information update at another device, such as a server. While network infrastructure devices or other devices may be used to route the information update to the recipient devices, those devices used to route the push-based update would not read the actual information update or process it, the routing devices would merely help route the update to the proper recipient devices. In other words, the information may be pushed through intermediate communications infrastructure devices. In some embodiments, however, the information may be pushed directly between devices without being transmitted to or retransmitted by any intermediate communications devices (e.g., if the sender and recipient device are configured to communicate directly with one another).

In some embodiments, the push-based updates may be transmitted through internet and/or non-internet connected communications infrastructure devices. For example, such push-based updates may be transmitted through a satellite communications network, a peer to peer communications network, or any other network and its associated devices as a communications relay. Even if some of the devices are connected to the internet (e.g., sender device, recipient device, intermediate communications infrastructure device), the push-based information updates may not be sent over the internet or using internet infrastructure.

In any case, the daemon process is therefore configured to monitor the information set or the application for the change and automatically transmit the change directly to the plurality of other computing devices so as to push the change upon the receiving of the change to the information set or the application. Such a method further removes any need for the user to be involved in pushing a particular, individual update to the recipient devices. In addition, the methods and systems described herein provide for pushing changes to an information set or application without necessitating a handshake process between the sender and recipient device. In many communications, devices establish a connection with one another via a series of transmit and receipt messages. However, in various embodiments, the sender device may just transmit information updates without determining whether the communication with the recipient device(s) has been established, and without the need to receive a confirmation receipt that the transmission was received.

The information set that may be monitored for updates may be any type of information on a client device. For example, the information set may be related to or may be a document, a word processing application or document, contact information, demographic information, mailing address, financial account information, information associated with the client or computing device, or information of another computing or client device associated with a user. Information sets that are part of an application or stored on the client device by an application may also be monitored for changes. In other words, any type of information stored on a client device may be monitored for changes.

Figure 6:
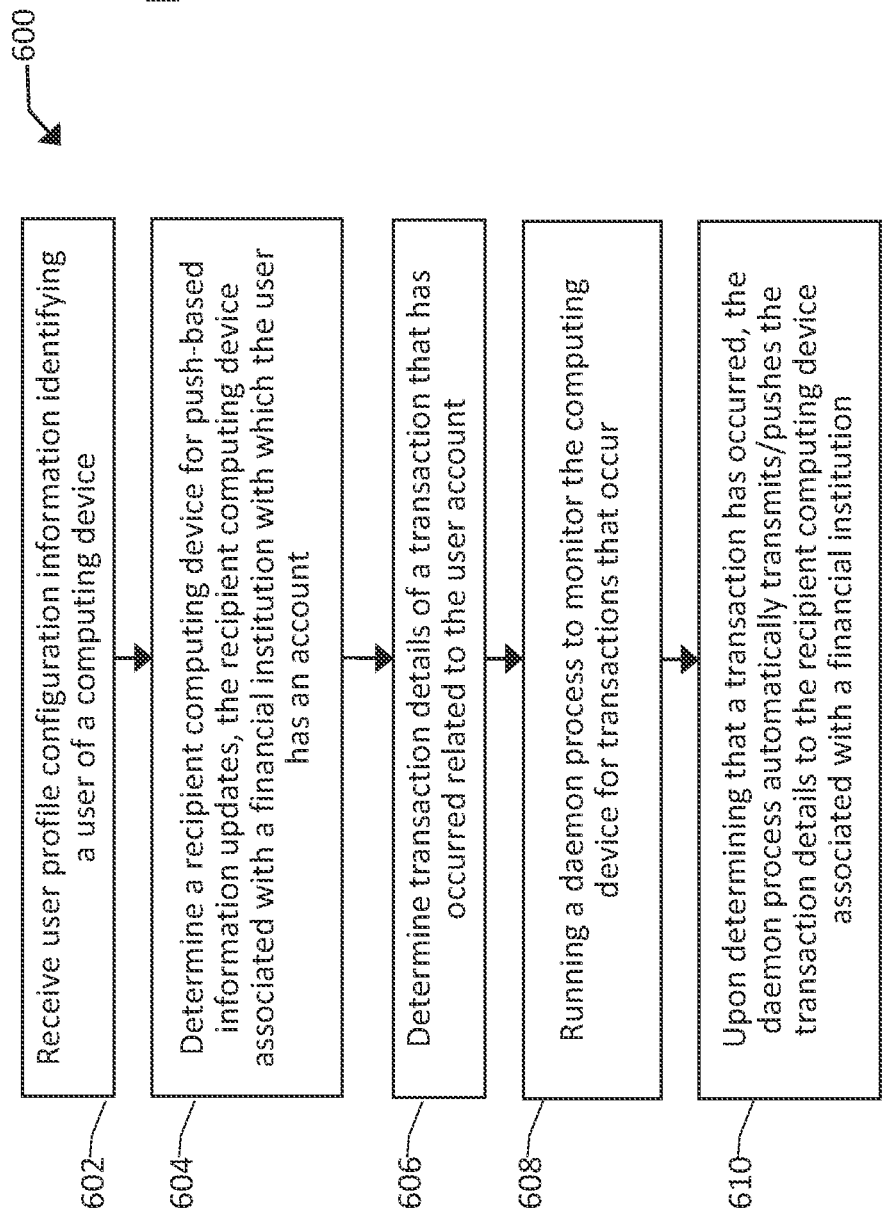
FIG. 6 is a flowchart illustrating another process for push-based transmissions using the target as a system of record in accordance with one or more embodiments of the present disclosure.

FIG. 6 is a flowchart illustrating another process 600 for push-based transmissions using the target as a system of record in accordance with one or more embodiments of the present disclosure. The process 500 includes operations that may be performed, for example, by a client device of FIGS. 1, 2, and/or 7-10.

At an operation 602, the user profile configuration information identifying a user is received by the client device. The operation 602 may be similar to the operation 502 of the process 500 described above. The user profile configuration information may further include information for identifying a user financial account (e.g., brokerage account, savings account, checking account, money market account, etc.). In this way, the client device may be used in connection with actions related to the user's financial account(s).

At an operation 604, a recipient computing device for push-based information updates is determined based on the user profile configuration information. For example, the recipient computing device may be associated with a financial institution with which the user has an account (e.g., by way of financial account information entered as part of the user profile configuration information). The recipient computing device for push-based information updates may therefore be one or more computing devices associated with the financial institution. In this way, the sender computing device may send information updates automatically to the user's financial institution.

At an operation 606, transaction details of a transaction that has occurred related to the user's financial account are determined. For example, a user may use their phone to pay for something using Zelle™, or any other type of payment processing, including payment processing that uses near field contact (NFC) devices or a scannable visual code to scan the phone to pay for something. Typically, a payment processing device and/or point of sale (POS) device may be used to scan an NFC or visual code for payment, and the payment processing device and/or POS device will process the payment, approve the payment, etc. The financial institution typically relies on that information from the payment processor and/or the retailer's POS device for the transaction details. The user is then responsible for checking their financial account to make sure that charges to their account are correct. In the embodiments described herein, the user's client device may also scan something related to the transaction (e.g., if using an NFC device the client device and payment processing device may communicate the transaction details, if using scannable visual codes the client device may scan a code indicating the transaction details). In any case, since the transaction details are determined by the client device, the transaction details may be an information change pushed to the financial institution device as further described below.

In an operation 608 a daemon process runs as a background process of an operating system of the client device so that changes in information sets (e.g., including for new transactions that have occurred using the client device) may be detected and pushed according the various embodiments described herein. The operation 608 may be similar to the operation 510 of the process 500 described above.

At an operation 610, upon determining that a transaction has occurred using the daemon process of the operating system, the daemon process also automatically transmits/pushes the transaction details to the recipient computing device associated with the financial institution. In other words, the daemon process is configured to monitor the computing device for transactions that occur and automatically transmit the transaction details directly to the recipient computing device associated by the financial institution without being received by any intermediate devices so as to push the transaction details upon the determining that the transaction has occurred. The transaction details comprise information configured for verification of the transaction by the financial institution. In other words, the transaction details may be used by the financial institution to verify the transaction details received from the retailer, the payment processor, the POS device, the payment processing device, etc. This advantageously offers an additional layer of security to prevent fraudulent transactions for both the client and the financial institution. By receiving the transaction details from the known client device and the retailer or payment processor, the financial institution can make sure the transaction details received from the client device matches the other transaction details. In addition, since the transaction details may be sent directly to the financial institution device without intermediate processing, such verification may take place quickly and easily.

The transaction details may include at least one of a transaction amount, a payment method, a merchant name, a timestamp, whether a purchase was in-store or online, geographic location information of the computing device at a time of the transaction, or any other information that may be useful in verifying a transaction. For example, the geographic location may be useful to determine that the client device was actually at the retailer location where the payment was made for an in-store purchase.

Information for providing payment for the transaction may be provided to a payment processing device from the client device as described herein (e.g., through NFC, scannable visual codes, etc.). The details of the transaction may further include identifying information associated with the client device, as needed to authorize a payment for the transaction. For an in-store payment, the payment processing device may be physically proximate to the client device when the information for providing payment for the transaction is transmitted to the payment processing device (e.g., in the NFC context). The recipient computing device may be physically remote from both the payment processing device and the client device at the time of the transaction. In other words, the client and payment processing device may be present where the transaction is taking place, but the financial institution device that receives the push-based information update may be remote to both devices. The transaction details from the client device may then be compared to information about the transaction provided by a payment processor or merchant for fraud prevention.

FIGS. 7-10 show further example systems that may be used according to the embodiments described herein. In particular, they demonstrate different types of network infrastructure that may be used to route information-based updates to various client devices. As described herein, such infrastructure devices may be used merely to route push-based information updates, and do not themselves process the information updates, determine recipients for the information updates, etc. Instead, such intermediate infrastructure devices may merely server to follow instructions received from the original sender client device to route a message to a recipient device, agnostic of the content of the message and/or the information updates or types of information updated therein. The devices, components, etc. of FIGS. 1-4 and 7-10 may be used in any configuration or in combination with one another in various embodiments. In other words, different embodiments may be used that use various configurations of client device types, communication infrastructure devices of different types, etc.

Figure 7:
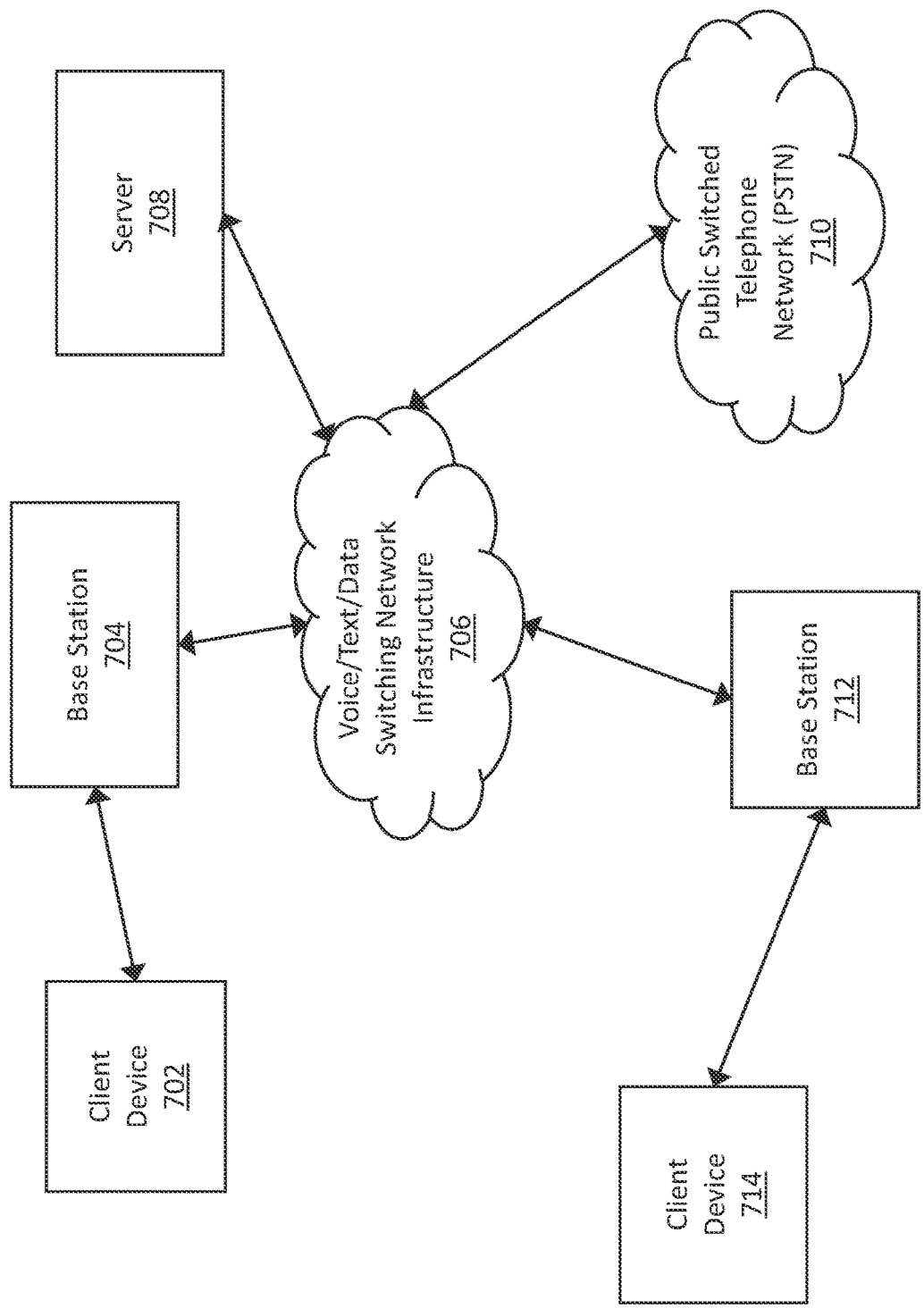
FIG. 7 is a block diagram of a system with base stations for push-based transmissions using the target as a system of record in accordance with one or more embodiments of the present disclosure.

FIG. 7 is a block diagram of a system 700 with base stations for push-based transmissions using the target as a system of record in accordance with one or more embodiments of the present disclosure. In particular, the system 700 includes client devices 702 and 714. The client devices 702 and 714 may be, for example, smartphones. The client devices 702 and 714 may be configured to communicate with base stations 704 and 712, respectively, of a cellular phone and data network, for example. The base stations 704 and 712 may be, for example, located on cell towers, buildings, or other structures for providing cellular based phone and data services through a voice/text/data switching network infrastructure 706.

The voice/text/data switching network infrastructure 706 may also be part of the cellular network and facilitate communication between the base stations 704 and 712, and subsequently the client devices 702 and 714. The voice/text/data switching network infrastructure 706 may also facilitate communication with devices outside of the cellular network, such as landline phone numbers through a public switched telephone network (PSTN) 710 and/or other devices capable of processing data such as the server 708. In some embodiments, the voice/text/data switching network infrastructure 706 may communicate with the server 708 over the internet, and the voice/text/data switching network infrastructure 706 may enable communication with any other devices over the internet. As such, the client device 702, for example, may push information updates to recipient devices such as the client device 714 and/or the server 708 as described herein using the network infrastructure devices (e.g., the base stations 704 and 712, the voice/text/data switching network infrastructure 706) of FIG. 7.

Figure 8:
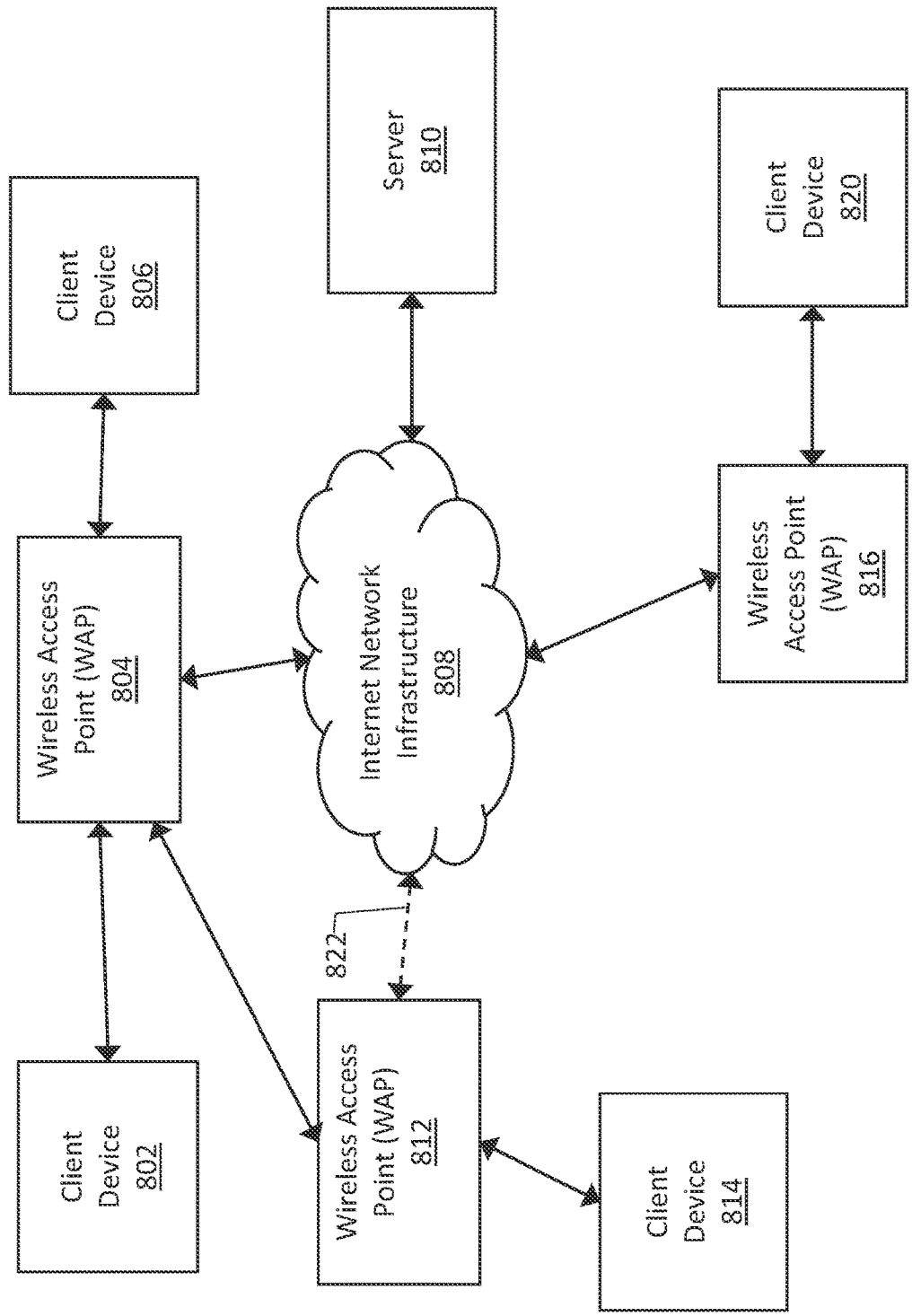
FIG. 8 is a block diagram of a system with wireless access points (WAP) for push-based transmissions using the target as a system of record in accordance with one or more embodiments of the present disclosure.

FIG. 8 is a block diagram of a system 800 with wireless access points (WAP) for push-based transmissions using the target as a system of record in accordance with one or more embodiments of the present disclosure. The system 800 includes client devices 802, 806, 814, and 820. The system 800 further includes wireless access points (WAP) 804, 812, and 816. WAPs 804, 812, and 816 may be, for example, wireless routers (e.g., WiFi) for connecting to internet network infrastructure 808. IN this way, the client devices 802, 806, 814, and/or 820 may push information updates to one another and/or receive information updates from one another as described herein without intermediate processing by another device (e.g., a server 810). However, in some embodiments, the server 810 may be a recipient for information updates and/or may originate information updates to be pushed to other devices.

In various embodiments, the information updates may be routed and or transmitted between devices in different ways. For example, an information update from the client device 802 to the client device 820 may be routed through the WAP 804, the internet network infrastructure 808, and the WAP 816 to reach the client device 820 because the client device 802 and the client device 820 are not within range to communicate with one another directly. In another embodiment, a connection to the internet network infrastructure 808 of the WAP 812 may be out or otherwise nonexistent as indicated by the broken line connector 822. However, in some embodiments, the WAP 812 may still be in connection with the WAP 804 (whether or not the WAP 804 is connected to the internet infrastructure). Accordingly, an information update may be pushed from the client device 806 to the WAP 804, to the WAP 812, and then to the client device 814. Such an information update may be pushed even in the event that neither of WAP 804 and 812 are connected to the internet network infrastructure 808. That is, network infrastructure devices such as the WAPs 804, 812, 816 etc. may be used to facilitate push-based information updates even in the absence of connections to the wider internet (e.g., a closed network may be used).

Figure 9:
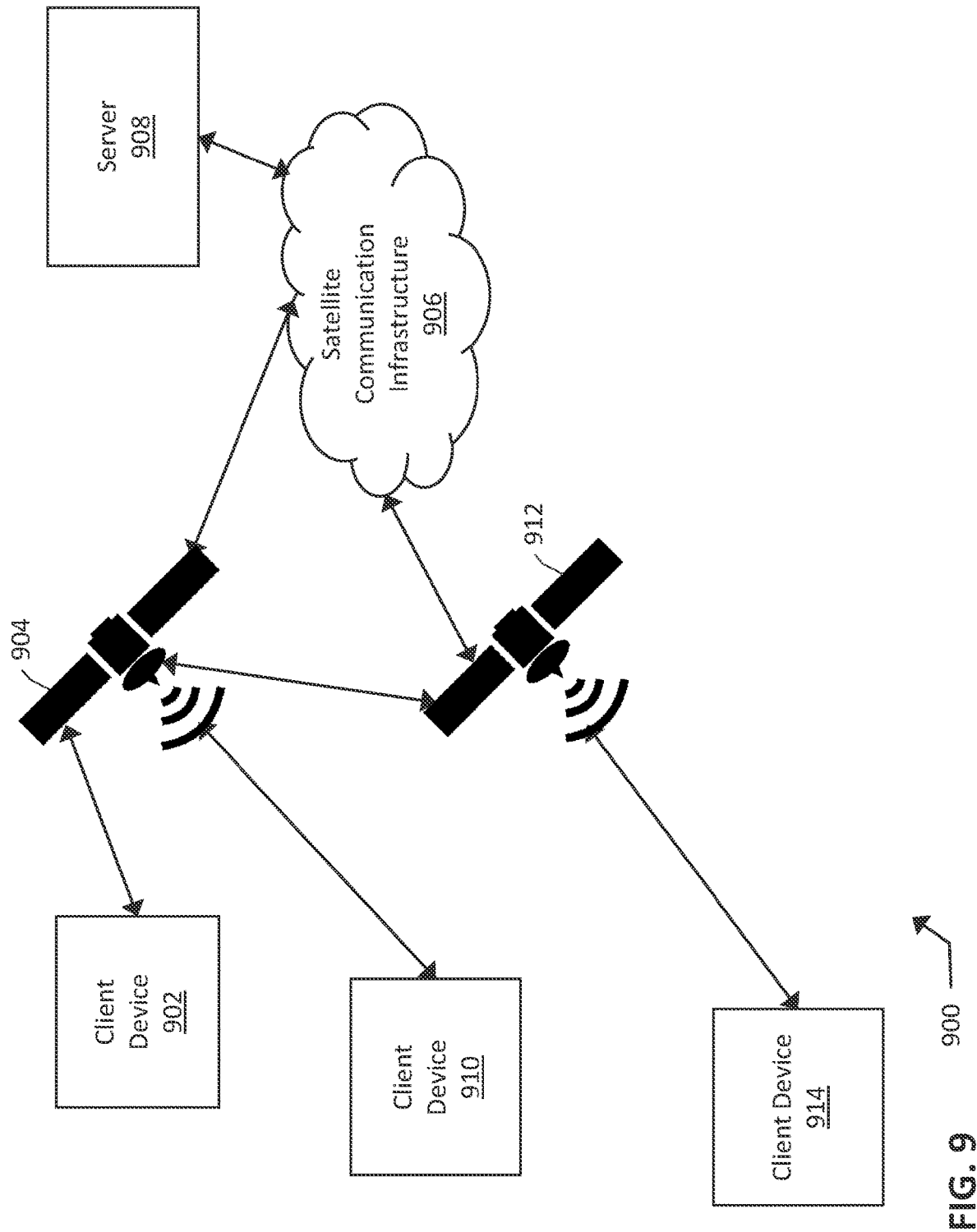
FIG. 9 is a block diagram of a system with satellites for push-based transmissions using the target as a system of record in accordance with one or more embodiments of the present disclosure.

FIG. 9 is a block diagram of a system 900 with satellites for push-based transmissions using the target as a system of record in accordance with one or more embodiments of the present disclosure. The system 900 includes client devices 902, 910, and 914 as well as satellites 904 and 912. The system 900 further includes a server 908 and satellite communication infrastructure 906. The satellites 904 and 912 may include network infrastructure communication devices on an orbiting satellite that is capable of communication with the client devices 902, 910, and 914. Only certain satellites may be within range of a client device at any given time. For example, the client devices 902 and 910 are within communication range of the satellite 904 while the client device 914 is in range with the satellite 912.

The satellites 904 and 912 may therefore be used as network infrastructure devices to facilitate push-based information updates as described herein, with or without connections to a wider network such as the internet. For example, the client device 902 may push an update to the client device 910, which may only be routed through the satellite 904. The client device 910 may push an update to the client device 914, which may be routed through the satellites 904 and 912, or through each of the satellites 904, 912 and the satellite communication infrastructure. The satellite communication infrastructure may be ground based infrastructure allowing the satellites 904 and 912 to communicate with each other or with other satellites if direct communication between satellites is not possible. The satellite communication infrastructure 906 may facilitate communication with other devices, such as the server 908, which may be a recipient of or originator of push-based information updates as well. The satellite communication infrastructure 906 may facilitate communications with other networks and devices connected thereto, such as the internet.

Figure 10:
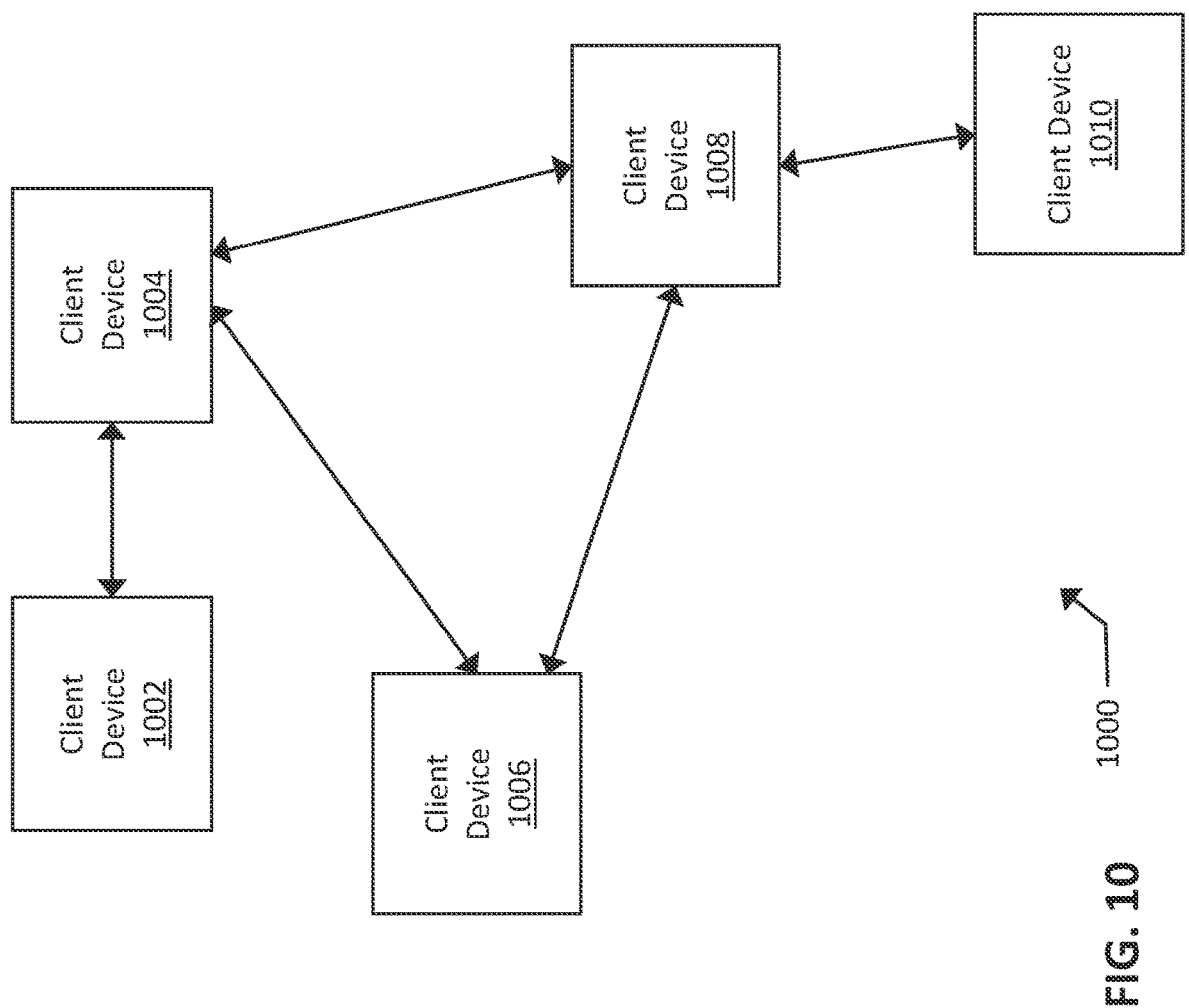
FIG. 10 is a block diagram of a system with a mesh network of client devices for push-based transmissions using the target as a system of record in accordance with one or more embodiments of the present disclosure.

FIG. 10 is a block diagram of a system 1000 with a mesh network of client devices for push-based transmissions using the target as a system of record in accordance with one or more embodiments of the present disclosure. A mesh network may be a peer to peer network of client devices for transmitting push-based information updates. In a given group of client devices 1002, 1004, 1006, 1008, and 1010, the devices may be outside of range of direct communication with one another (e.g., through Bluetooth or other communication protocols). For example, the client device 1004 is only in range to communicate with the client devices 1002, 1006, and 1008. However, the client device 1004 may still route a push-based update to or receive a push-based update from the client device 1010 through the client devices 1008 and/or 1006. In this way, a large number of client devices may form a network of client devices that may route updates to one another without the use of a separate network or network infrastructure.

In the example of FIG. 10, for a given information update being pushed, some client devices may act as network infrastructure. In other words, if the client device 1006 pushes an update to the client device 1002 via the client device 1004, the client device 1004 may act as network infrastructure, and may not process or read the information based update, but rather may just route the push-based update onto the client device 1002.

This mesh network may also change as the client devices move and come into and out communication range with one another. For example, the client device 1002 may move into range of direct communication with the client device 1010. In such an example, information updates may be sent to the client device 1010 directly rather than be routed through the client devices 1004, 1006, and/or 1008.

In some embodiments of the system of FIG. 10, the push-based updates may be broadcast from the sender device, such that any client device in range may receive the push-based update and instructions for routing the push-based update to the correct client device. A client device receiving such a broadcast may in turn broadcast the update if it is not the intended recipient of the push-based update. In this way, the update may eventually reach the intended device even if the client devices do not have awareness of which other client devices they are in contact with (e.g., they do not know how the network connections are currently configured).

At least some aspects of the present disclosure will now be described with reference to the following numbered clauses.

1. A method comprising:
    receiving, by a processor of a computing device, user profile configuration information identifying a user;
    determining, by the processor, a recipient list for push-based information updates, wherein the recipient list comprises a plurality of other computing devices and the recipient list is associated with the user profile configuration information;
    determining, by the processor, an information set or application for the push-based information updates;
    receiving, by the processor, an input comprising a change to the information set or the application; and
    running, by the processor, a daemon process as a background process of an operating system of the computing device,
    wherein the daemon process is configured to monitor the information set or the application for the change and automatically transmit the change directly to the plurality of other computing devices without being received by any intermediate devices so as to push the change upon the receiving of the input comprising the change to the information set or the application.
2. The method of clause 1, wherein the determining of the recipient list comprises determining the computing devices with which the computing device has previously shared the information set or data associated with the application.
3. The method of clause 2, wherein the determining of the recipient list further comprises determining computing devices with which the user of the computing device has opted into sharing the information set or data associated with the application.
4. The method of clause 1, further comprising receiving, by the processor, a deselection of one of the plurality of other computing devices of the recipient list, such that a deselected one of the plurality of other computing devices is removed from the recipient list.
5. The method of clause 1, wherein the information set or the application comprises at least one of a specific document, a word processing application, contact information, demographic information, mailing address, financial account information, information associated with the computing device, or information of another computing device associated with the user.
6. The method of clause 1, the determining of the recipient list and the information set or the application for the push-based information updates comprises:
    receiving, by the processor, a first user input indicating a first plurality of other computing devices to which changes to a first information set or a first application are transmitted; and
    receiving, by the processor, a second user input indicating a second plurality of other computing devices to which changes to a second information set or a second application are transmitted.
7. The method of clause 1, wherein the automatic transmit of the change comprises transmitting the change directly to the plurality of other computing devices without being transmitted through any intermediate communications infrastructure.
8. The method of clause 1, wherein the computing device is a first computing device associated with the user, and further wherein at least a second computing device is also associated with the user.
9. The method of clause 8, wherein the change to the information set or the application is also transmitted to the second computing device.
10. A system comprising:
    a memory;
    a display; and
    at least one processor of a computing device that is coupled to the memory, the at least one processor configured to:
        receive user profile configuration information identifying a user;
        determine a recipient list for push-based information updates, wherein the recipient list comprises a plurality of other computing devices and the recipient list is associated with the user profile configuration information;
        determine an information set or application for the push-based information updates;
        receive an input comprising a change to the information set or the application; and
        run a daemon process as a background process of an operating system of the computing device,
        wherein the daemon process is configured to monitor the information set or the application for changes and automatically transmit the change to the information set or the application upon the receiving of the input comprising the change to the information set or the application.
11. The system of clause 10, wherein the automatic transmit of the change comprises transmitting the change to the plurality of other computing devices via a non-internet connected communications infrastructure.
12. The system of clause 10, wherein the automatic transmit of the change comprises transmitting the change to the plurality of other computing devices via a satellite as a communications relay.
13. The system of clause 10, wherein the automatic transmit of the change is configured to be transmitted over internet infrastructure, but is never received at or re-transmitted by an intermediate server associated with the information set or the application.
14. The system of clause 13, wherein the change to the information set or the application is transmitted to the plurality of other computing devices without a handshake process occurring between the computing device and any of the plurality of other computing devices.

15. The system of clause 13, further comprising:
    receiving, by the at least one processor, a request to be removed from the recipient list from one of the plurality of other computing devices of the recipient list comprising; and
    removing, by the at least one processor, the one of the plurality of other computing devices from the recipient list.
16. A non-transitory computer readable medium having instructions stored thereon that, upon execution by a computing device, cause the computing device to perform operations comprising:
    receiving user profile configuration information identifying a user;
    determining a recipient computing device for push-based information updates based on the user profile configuration information, wherein the recipient computing device is associated with a financial institution with which the user has an account;
    determining transaction details of a transaction that has occurred related to the account; and
    running a daemon process as a background process of an operating system of the computing device,
    wherein the daemon process is configured to monitor the computing device for transactions that occur and automatically transmit the transaction details directly to the recipient computing device without being received by any intermediate devices so as to push the transaction details upon the determining that the transaction has occurred, and
    wherein the transaction details comprise information configured for verification of the transaction by the financial institution.
17. The non-transitory computer readable medium of clause 16, wherein the transaction details comprise at least one of a transaction amount, a payment method, a merchant name, a timestamp, whether a purchase was in-store or online, or geographic location information of the computing device at a time of the transaction.
18. The non-transitory computer readable medium of clause 16, wherein the instructions further cause the computing device to perform operations comprising transmitting, to a payment processing device, information for providing payment for the transaction, and wherein the transaction details comprise identifying information associated with the computing device.
19. The non-transitory computer readable medium of clause 18, wherein the payment processing device is physically proximate to the computing device when the information for providing payment for the transaction is transmitted to the payment processing device, and further wherein the recipient computing device is physically remote from both the payment processing device and the computing device at a time of the transaction.
20. The non-transitory computer readable medium of clause 16, wherein the transaction details are configured to be compared to information about the transaction provided by a payment processor or merchant for fraud prevention.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 3 and 4) and cloud servers are examples.

In some embodiments, as detailed herein, one or more of the computer-based systems of the present disclosure may obtain, manipulate, transfer, store, transform, generate, and/ or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux™, (2) Microsoft Windows™, (3) OS X (Mac OS), (4) Solaris™, (5) UNIX™ (6) VMWare™, (7) Android™, (8) Java Platforms™, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
   receiving, by a processor of a computing device, user profile configuration information identifying a first user;
   determining, by the processor, a recipient list for push-based information updates, wherein the recipient list comprises a plurality of other computing devices that are each associated with a plurality of users other than the first user, and the recipient list is associated with the user profile configuration information;
   determining, by the processor, an information set or application for the push-based information updates;
   receiving, by the processor, an input comprising a change to the information set or the application; and
   running, by the processor, a daemon process as a background process of an operating system of the computing device,
   wherein the daemon process is configured to monitor the information set or the application for the change and automatically transmit the change directly to the plurality of other computing devices without being received by any intermediate devices so as to push the change upon the receiving of the input comprising the change to the information set or the application, wherein the change is transmitted to the plurality of other computing devices without receiving a request for the change from any of the plurality of computing devices.

2. The method of claim 1, wherein the determining of the recipient list comprises determining the computing devices with which the computing device has previously shared the information set or data associated with the application.

3. The method of claim 2, wherein the determining of the recipient list further comprises determining computing devices with which the user of the computing device has opted into sharing the information set or data associated with the application.

4. The method of claim 1, further comprising receiving, by the processor, a deselection of one of the plurality of other computing devices of the recipient list, such that a deselected one of the plurality of other computing devices is removed from the recipient list.

5. The method of claim 1, wherein the information set or the application comprises at least one of a specific document, a word processing application, contact information, demographic information, mailing address, financial account information, information associated with the computing device, or information of another computing device associated with the user.

6. The method of claim 1, the determining of the recipient list and the information set or the application for the push-based information updates comprises:
   receiving, by the processor, a first user input indicating a first plurality of other computing devices to which changes to a first information set or a first application are transmitted; and
   receiving, by the processor, a second user input indicating a second plurality of other computing devices to which changes to a second information set or a second application are transmitted.

7. The method of claim 1, wherein the automatic transmit of the change comprises transmitting the change directly to the plurality of other computing devices without being transmitted through any intermediate communications infrastructure.

8. The method of claim 1, wherein the computing device is a first computing device associated with the user, and further wherein at least a second computing device is also associated with the user.

9. The method of claim 8, wherein the change to the information set or the application is also transmitted to the second computing device.

10. A system comprising:
    a memory;
    a display; and
    at least one processor of a computing device that is coupled to the memory, the at least one processor configured to:
    receive user profile configuration information identifying a first user;
    determine a recipient list for push-based information updates, wherein the recipient list comprises a plurality of other computing devices that are each associated with a plurality of users other than the first user, and the recipient list is associated with the user profile configuration information;
    determine an information set or application for the push-based information updates;
    receive an input comprising a change to the information set or the application; and
    run a daemon process as a background process of an operating system of the computing device,
    wherein the daemon process is configured to monitor the information set or the application for changes and automatically transmit the change to the information set or the application upon the receiving of the input comprising the change to the information set or the application, wherein the change is transmitted to the plurality of other computing devices without receiving a request for the change from any of the plurality of computing devices.

11. The system of claim 10, wherein the automatic transmit of the change comprises transmitting the change to the plurality of other computing devices via a non-internet connected communications infrastructure.

12. The system of claim 10, wherein the automatic transmit of the change comprises transmitting the change to the plurality of other computing devices via a satellite as a communications relay.

13. The system of claim 10, wherein the automatic transmit of the change is configured to be transmitted over internet infrastructure, but is never received at or re-transmitted by an intermediate server associated with the information set or the application.

14. The system of claim 13, wherein the change to the information set or the application is transmitted to the plurality of other computing devices without a handshake process occurring between the computing device and any of the plurality of other computing devices.

15. The system of claim 13, further comprising:
  receiving, by the at least one processor, a request to be removed from the recipient list from one of the plurality of other computing devices of the recipient list comprising; and
  removing, by the at least one processor, the one of the plurality of other computing devices from the recipient list.

16. A non-transitory computer readable medium having instructions stored thereon that, upon execution by a computing device, cause the computing device to perform operations comprising:
  receiving user profile configuration information identifying a user;
  determining a recipient computing device for push-based information updates based on the user profile configuration information, wherein the recipient computing device is associated with a financial institution with which the user has an account and the computing device is not accessible by the user;
  determining transaction details of a transaction that has occurred related to the account; and
  running a daemon process as a background process of an operating system of the computing device,
  wherein the daemon process is configured to monitor the computing device for transactions that occur and automatically transmit the transaction details directly to the recipient computing device without being received by any intermediate devices so as to push the transaction details upon the determining that the transaction has occurred,
  wherein the transaction details comprise information configured for verification of the transaction by the financial institution, and
  wherein the transaction details are sent to the recipient computing device without receiving a request for the transaction details from the recipient computing device.

17. The non-transitory computer readable medium of claim 16, wherein the transaction details comprise at least one of a transaction amount, a payment method, a merchant name, a timestamp, whether a purchase was in-store or online, or geographic location information of the computing device at a time of the transaction.

18. The non-transitory computer readable medium of claim 16, wherein the instructions further cause the computing device to perform operations comprising transmitting, to a payment processing device, information for providing payment for the transaction, and wherein the transaction details comprise identifying information associated with the computing device.

19. The non-transitory computer readable medium of claim 18, wherein the payment processing device is physically proximate to the computing device when the information for providing payment for the transaction is transmitted to the payment processing device, and further wherein the recipient computing device is physically remote from both the payment processing device and the computing device at a time of the transaction.

20. The non-transitory computer readable medium of claim 16, wherein the transaction details are configured to be compared to information about the transaction provided by a payment processor or merchant for fraud prevention.

\* \* \* \* \*